FIG. 1

INVENTORS.
JAMES L. JOHNSON
FRANK C. SCHORA, JR.
PAUL B. TARMAN

United States Patent Office 3,700,422
Patented Oct. 24, 1972

3,700,422
CONTINUOUS STEAM-IRON PROCESS FOR MAKING FUEL GAS
James L. Johnson, Oak Park, Frank C. Schora, Jr., Palatine, and Paul B. Tarman, Elmhurst, Ill., assignors to Consolidation Coal Company, Pittsburgh, Pa.
Original application Feb. 11, 1969, Ser. No. 798,334. Divided and this application Feb. 17, 1971, Ser. No. 116,054
The portion of the term of the patent subsequent to Nov. 9, 1988, has been disclaimed
Int. Cl. C10j 3/20
U.S. Cl. 48—197 R                           10 Claims

ABSTRACT OF THE DISCLOSURE

In a continuous steam-iron process wherein finely divided iron oxides are reduced in a reduction zone and the reduced iron oxides are reacted with steam and hydrocarbonaceous solids in an oxidation zone to make fuel gas, the reduction of the iron oxides is effected by means of a continuously recirculating stream of hot, finely divided carbonaceous solids which are mixed with the iron oxides in a downwardly moving bed under reducing conditions, and heat is supplied to the reduction zone by the carbonaceous solids which are heated by partial combustion outside the reduction zone. In the preferred embodiment of the process, the mixture of reduced iron oxides and carbonaceous solids from the reduction zone is separated in a fluidized separation zone into a stream of reduced iron oxides and a stream of carbonaceous solids. The stream of reduced iron oxides is conducted to the oxidation zone where the reduced iron oxides fall through a fluidized bed of hydrocarbonaceous solids in countercurrent flow relationship to steam, whereby a product gas is produced which contains methane by virtue of the reaction of the hydrogen (produced by the steam-iron reaction) with the hydrocarbonaceous solids.

REFERENCE TO RELATED APPLICATION

This application is a division of copending application, Ser. No. 798,334, filed Feb. 11, 1969, now Pat. No. 3,619,-142 issued Nov. 9, 1971, and assigned to the assignee of the present invention.

BACKGROUND OF THE INVENTION

Field of the invention

This invention relates to an improvement in the steam-iron process for making fuel gas.

The steam-iron process is a process for making hydrogen by the reaction of steam with either elemental iron or a lower iron oxide, for example, FeO. The reaction produces higher oxides of iron, for example, $Fe_3O_4$, which may be reduced to repeat the cycle.

Despite the apparent simplicity of the steam-iron process and despite the fact that it has been known and worked on for over one hundred years, to the best of our knowledge no technically and economically feasible embodiment of a continuous steam-iron process has been developed which is now practiced commercially. Perhaps the principal reason for the failure of the steam-iron process to achieve commercial success is the difficulty involved in making it a continuous process. To do so requires subjecting a continuously flowing recirculatory stream of iron oxides to two different reactions, namely oxidation and reduction, under optimum conditions for each reaction, including optimum input and distribution of the heat required in the process.

Description of the prior art

Prior continuous steam-iron processes have favored the use of gaseous reductants for reducing the iron oxides (see, by way of illustration, U.S. Pat. No. 2,198,560). However, the production of a suitable gaseous reductant is expensive, and renders the overall process uneconomical. Furthermore, because of the limitations imposed by the thermodynamic equilibrium during the reduction of $Fe_3O_4$ and FeO to FeO and Fe with reducing gases containing hydrogen and carbon monoxide, the off-gas from once-through reduction contains considerable unreacted hydrogen and carbon monoxide. Thus, such a process tends to be wasteful of reducing gas.

In U.S. Pat. No. 3,503,724 of Homer E. Benson, issued Mar. 31, 1970, the reducing gas is made in situ by reacting air and carbonaceous solids in the presence of the iron oxides. Such a process has many advantages but requires careful control to minimize reconversion of elemental iron to higher oxides by contact with air.

Continuous steam-iron processes have been proposed which utilize either a solids in gas dispersion or the fluidized solids technique in the oxidation zone and the reduction zone (see, by way of illustration, U.S. Pat. Nos. 2,602,809 and 3,017,250). Reducing systems employing a dispersion of powdered iron oxide in a suspending gas cell for large reactors and costly gas-solids separators. All attempts to operate with the iron oxide in a fluidized condition have failed to become sufficiently attractive for commercial adoption because a fluidized mass is of uniform composition throughout whereas a composition gradient is generally desired.

SUMMARY OF THE INVENTION

In accordance with the present invention, we have provided an improved continuous steam-iron process for making fuel gas which uses not only a recirculatory stream of particulate iron oxides, but also uses a recirculatory stream of particulate carbonaceous solids to effect reduction of the iron oxides and to supply process heat requirements. In the practice of the process of this invention, reduced iron oxides comprising principally FeO and Fe are oxidized by steam in an oxidation zone, and iron oxides comprising principally $Fe_3O_4$ and FeO are reduced in a reduction zone. By "principally" we mean that at least fifty percent by weight of any mixture of oxidizable or reducible iron compounds, as the case may be, consists of the indicated compounds, and the actual percentage approaches 100 percent under equilibrium conditions. The relative amounts of FeO and Fe in the oxidizable mixture, and the relative amounts of $Fe_3O_4$ and FeO in the reducible mixture are functions largely of the temperature, pressure, and residence time maintained in the respective reaction zones. The oxidation of FeO and Fe (sometimes simply referred to herein as reduced iron oxides) is accomplished by passing steam in reactive relationship with the reduced iron oxides in an oxidation zone. The reduction of $Fe_3O_4$ and FeO is accomplished by subjecting them to direct contact with the recirculatory stream of hot carbonaceous solids in a downwardly moving bed in the reduction zone. No oxygen (molecular) containing gases are introduced into the moving bed in the reduction zone. The reduction conditions are selected to insure that only partial carbon depletion is effetced during the passage of the carbonaceous solids through the reduction zone, while however, the desired reduction of the iron oxides to Fe and FeO is effected. Heat is supplied to meet the requirements of the process by partial combustion of the carbonaceous solids in a combustion zone located outside the reduction zone. The amount of partial burning is controlled to raise the temperature of the carbonaceous solids sufficiently high to supply adiabatically the heat required.

In the preferred embodiment of the process, a separation zone is interposed between the reduction zone and the oxidation zone to effect separation of the carbonaceous solids from the reduced iron oxides leaving the reduction zone. Separation is effected by passing a gas through the mixture of carbonaceous solids and reduced iron oxides at a velocity which permits ready separation by virtue of the difference in densities of the iron compounds and carbonaceous solids. A fluidized separation zone is especially preferred wherein the fluidized bed consists essentially of the lighter carbonaceous solids from which the heavier iron compounds may be withdrawn and sent to the oxidation zone. The oxidation zone in the preferred embodiment comprises a fluidized bed of fresh carbonaceous solids into which the reduced iron oxides are fed. Hydrogen is produced by the relatively fast reaction of steam and reduced iron oxides, and in turn reacts with the carbonaceous solids to form methane. The separated carbonaceous solids from the separation zone are recirculated through the combustion zone back to the reduction zone.

The process operates continuously and efficiently to yield a methane-rich gas. The improvement in economics of the process as compared with prior steam-iron processes is due to the efficient use of low cost, finely divided carbonaceous solids for (1) the reduction of iron oxides, (2) the supply of process heat, and (3) the production of methane in a relatively simple two-vessel system. The gain in efficiency in the reduction zone arises from the thermal gradient established in the downwardly moving bed and from the lack of back-mixing of reduced iron. Thus, maximum reaction rates result from the counter-current flow relationship of the upwardly flowing reducing gases (generated in situ) and the downwardly flowing fresh iron oxides. The absence of molecular oxygen-containing gases assures no loss of desired reduction as a result of competing reactions. The flow of gases and solids in the oxidizer is most efficiently conducted in a fluidized bed for the particular reactions involved, to thereby minimize temperature gradients and to provide for an efficient balance between exothermic and endothermic reactions. Thus, in summary, the improved process provides for the maintenance of the optimum conditions for the reduction of $Fe_3O_4$ to $FeO$ to $Fe$, and for the oxidation of the reduced iron oxides with steam.

BRIEF DESCRIPTION OF THE DRAWINGS

For a better understanding of our invention, its objects and advantages, reference should be had to the following description and accompanying drawings in which.

Figure 1:
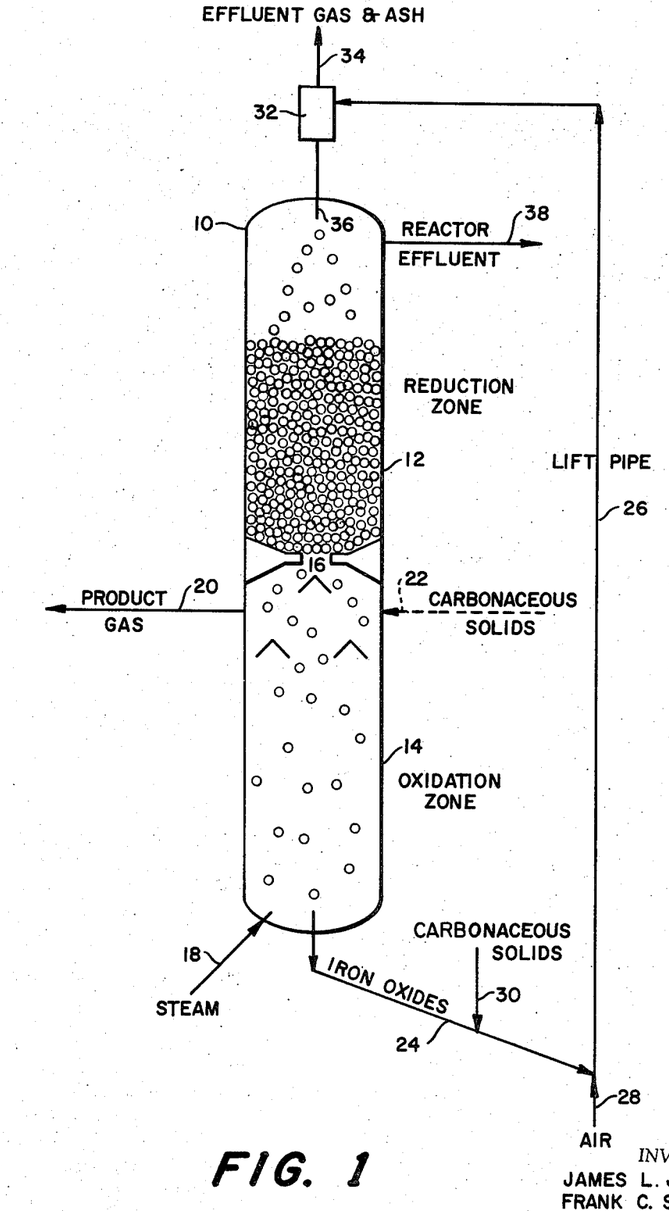
FIG. 1 is a diagrammatic drawing of our invention in its broadest aspects.

DESCRIPTION OF FIGURE 1

Referring to FIG. 1 of the drawings, the numeral 10 designates a suitable vessel for housing a reduction zone 12 and an oxidation zone 14. The reduction zone consists essentially of a downwardly moving bed of solids which flows by gravity through an opening 16 into the oxidation zone. The downwardly moving bed of solids in the reduction zone consists essentially of a mixture of two recirculatory streams of solids moving in substantially concurrent flow relationship. The first stream of solids contains iron oxides which are principally $Fe_3O_4$ and $FeO$. The second stream of solids contains carbonaceous solids which serve not only to effect reduction of the iron oxides, but also to provide adiabatically the heat required for the reduction reaction. The primary reactions which occur in the reduction zone are as follows:

(1)           $CO + Fe_3O_4 \rightarrow 3\ FeO + CO_2$
(2)           $CO + FeO \rightarrow Fe + CO_2$
(3)           $CO_2 + C \rightarrow 2\ CO$ The temperature maintained in the reduction zone is between 1000 and 2600° F. The pressure may be atmospheric or superatmospheric. The size consist of the iron oxides may suitably be in the range of 325 to 2 Tyler Standard screen. The size consist of the carbonaceous solids may also suitably be in the range of 325 to 2 Tyler Standard screen. The residence time of both solids in the reduction zone is generally between fifteen seconds and 60 minutes.

The carbonaceous solids in the reduction zone may conveniently be a solid carbonaceous fuel that is noncaking under the conditions of the reduction zone. Suitable solids of this kind are noncaking coals, lignite, coke, char which is the solid product obtained by the pyrolysis of coal or lignite, or coals rendered noncaking by preoxidation. Such solids are generally ash-containing, and as will be shown later, provision must be made for discharging ash from the overall system to prevent its build-up beyond a given point. Actually, up to a point, the ash serves as a heat carrier for maintaining the desired temperature in the reduction zone. In general, the carbon content of the carbonaceous solids in the reduction zone is at least twenty percent by weight. The weight ratio of carbon to iron oxide in the reduction zone must be sufficient to assure the required conversion of $Fe_3O_4$ and $FeO$ to $FeO$ and $Fe$ during the passage through the reduction zone.

In the broadest aspect of this invention, the reduced iron oxides, together with carbon-depleted carbonaceous solids, flow into the oxidation zone without any attempt to separate the two solids systems. This is not the preferred procedure as will be seen in the description of the preferred embodiment. However, in the case of very reactive carbonaceous solids such as some lignites, it is feasible for them even in a carbon-depleted state to react with steam in the oxidation zone, even in the presence of iron or $FeO$. The less reactive carbonaceous solids in a carbon-depleted state would generally constitute a mass of relatively inert solids, thus reducing the effective throughput in the oxidation zone.

In the oxidation zone, steam is introduced through a steam inlet 18 and is circulated in reactive relationship to the reduced iron oxides. The reaction of steam with $Fe$ and with $FeO$ is extremely rapid and exothermic. The reactions are as follows:

(4)           $H_2O + Fe \rightarrow FeO + H_2$
(5)           $H_2O + 3\ FeO \rightarrow Fe_3O_4 + H_2$ Any gas-solids system may be used in the oxidation zone to make hydrogen because of the high rate of reaction of steam and the reduced iron oxides. If a fuel gas is the desired product, then the best system is determined by the reactivity of the carbonaceous solids fed to the oxidation zone or by the extent of carbon gasification desired. For example, a free-fall system in which solids have a relatively short residence time may be used for highly reactive carbonaceous solids, or in those instances where a relatively small amount of carbon gasification is desired for less reactive carbonaceous solids. Where significant carbon gasification is desired with less reactive carbonaceous solids, a fluidized bed system may be used. The temperature maintained in the oxidation zone is generally between 1000 and 2000° F. The pressure may be atmospheric or superatmospheric. The residence time of the solids in the oxidation zone may be between 30 seconds and 200 minutes. The higher pressures and longer residence times favor methane production, and the shorter residence times are sufficient for hydrogen production.

In addition to the reaction of steam with the reduced iron oxides to make hydrogen, there will be some reaction of steam with any carbonaceous solids that are present to produce CO and $H_2$, as well as some $CO_2$. More importantly, the hydrogen produced by the steam-Fe, steam-FeO, or steam-carbon reaction will react with the carbonaceous solids to produce methane, particularly at elevated pressures. If desired, fresh carbonaceous solids may be introduced into the oxidation zone through a conduit 22 to increase the content of methane in the product gas. The mixture of gases is discharged as product gas through a conduit 20 for direct use or for further treatment or purification, as may be desired.

The solid product of the oxidation zone, principally FeO and $Fe_3O_4$, along with unreacted carbonaceous solids, are withdrawn from the oxidation zone through a pipe 24 to a lift pipe 26 for recirculation to the reduction zone. The lift pipe 26 constitutes an elongated combustion zone for partially burning the carbonaceous solids with air introduced through an air feed pipe 28. Additional fresh carbonaceous solids may also be introduced through a feed pipe 30 to replenish the carbon consumed in the oxidation and reduction zones, as well as in the combustion lift pipe 26. The conditions maintained in the combustion lift pipe 26 are such as to insure partial combustion of the carbonaceous solids to raise the temperature of the upwardly flowing mass of solids to a temperature sufficiently high to provide the necessary heat for the reduction reaction. As the carbonaceous solids recirculate through the recirculatory system there is a build-up of ash. This ash may be separated from the main stream of recirculatory solids from the lift pipe 26 in a cyclone separator 32 or by other suitable means. The flue gas, plus such ash, is discharged through a pipe 34 while the mixture of hot iron oxides and carbonaceous solids drops through pipe 36 onto the downwardly moving bed in the reduction zone. The effluent gas from the latter is withdrawn separately through a pipe 38.

DESCRIPTION OF THE PREFERRED EMBODIMENT

Figure 2:
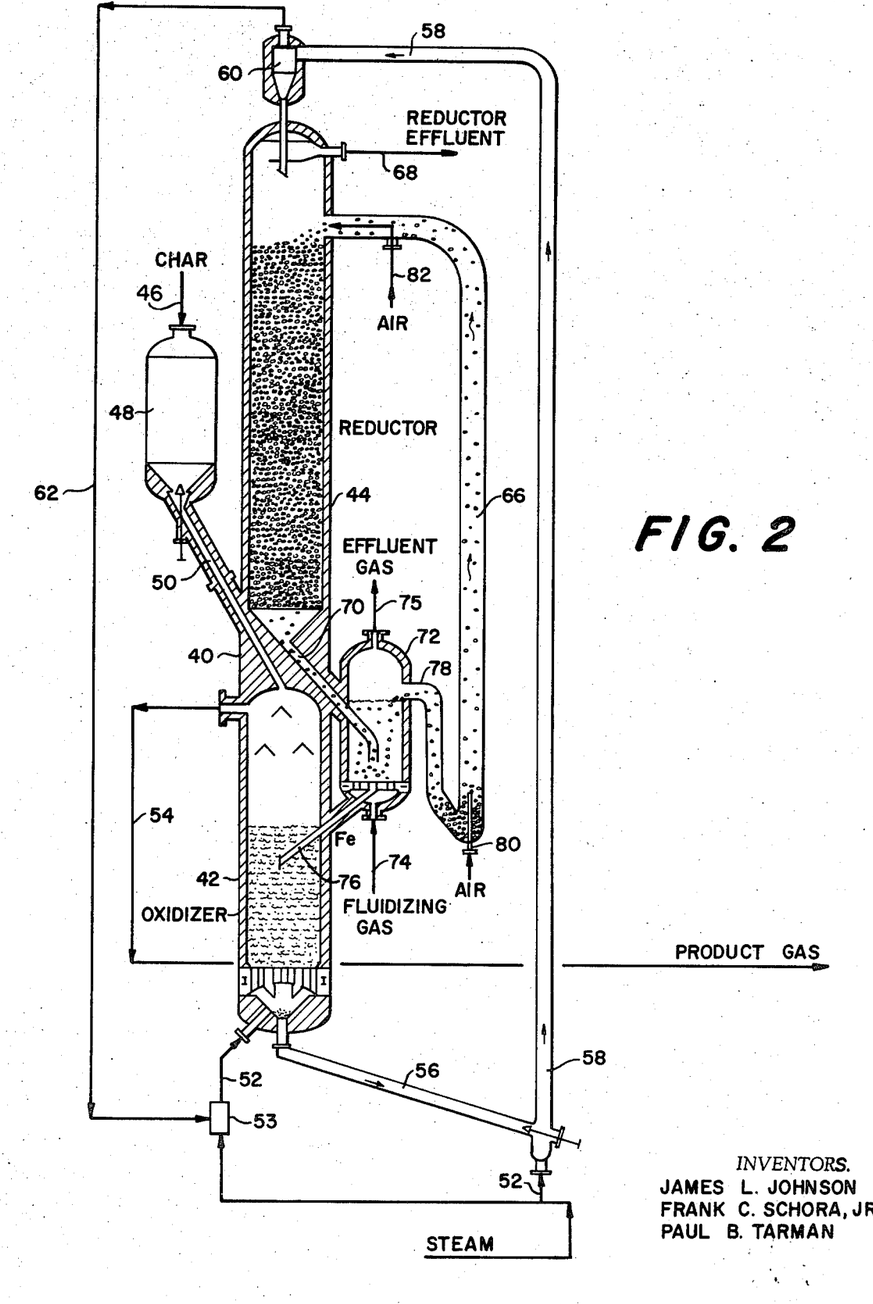
FIG. 2 is a diagrammatic drawing of the preferred embodiment of our invention.

The preferred embodiment shown diagrammatically in FIG. 2 is adapted to produce a methane-containing gas that may be converted by conventional means to a high B.t.u. gas. Fresh hydrocarbonaceous solids containing both fixed carbon and volatile carbon are continuously fed to the oxidation zone, labeled Oxidizer in the drawing and also designated by the numeral 42. The oxidation zone is contained in the lower part of a vessel 40, the upper part of which confines the reduction zone 44, sometimes called Reductor. The fresh, hydrocarbonaceous solids fed to the Oxidizer are high in total carbon content, in the range of fifty to ninety percent by weight. Preferably we use either char, the noncaking solid product resulting from pyrolysis of coal or lignite at low temperature, or a raw coal which has been rendered noncaking, if necessary, by preoxidation. The char, or raw coal (and hereafter reference is made only to char for convenience), is introduced by a pipe 46 into a continuous hopper 48 from which valve-regulated amounts of char are fed by a pipe 50 into the open space above the oxidation zone.

The char is maintained in a dense fluidized phase which serves as the oxidation zone. Elemental Fe and FeO substantially free of carbonaceous solids are introduced directly into the interior of the fluidized bed from a source and in a manner to be later described. The elemental Fe and FeO being of greater density than the fluidized char, descend in the bed in countercurrent flow relationship to steam which is introduced by a steam pipe 52 after being compressed by a jet compressor 53. Under the temperature and pressure conditions maintained in the oxidation zone, the steam reacts preferentially and rapidly with the elemental Fe and FeO as set forth in Equations 4 and 5 above, to form hydrogen. At least some of the latter reacts with the char in the fluidized bed to form methane. The methane is discharged together with unused steam through an effluent gas pipe 54 for suitable treatment to recover a high B.t.u. gas.

The conditions maintained in the oxidation zone of the preferred embodiment are as follows: temperature, 1400 to 1800° F.; pressure, 100 to 1500 p.s.i.; and residence time of char, 1 to 200 minutes, with the higher pressures and longer residence times being preferred for methane production.

The mixture of iron oxides, mostly $Fe_3O_4$ and FeO, along with carbon-depleted char, is withdrawn from the oxidation zone through a pipe 56. This mixture is lifted to the reduction zone through a lift pipe 58 by means of steam from the steam feed pipe 52. In recycling to the reduction zone, the solids pass through a cyclone separator 60 which separates the steam from the solids. The steam is returned through a conduit 62 to the oxidation zone after being compressed to the desired pressure, together with the rest of the inlet steam in the compressor 53. The solids drop out of the cyclone 60 into the space above the moving bed and thence onto the moving bed in the reduction zone.

The reduction zone, as in the case of the embodiment shown in FIG. 1, consists essentially of a downwardly moving bed of two substantially concurrently flowing streams of solids. The recycled iron oxides are mixed with the hot stream of carbonaceous solids entering the vessel from a lift pipe 66 whose function will be more fully described below. The gas produced in the reduction zone is discharged through a pipe 68. The conditions maintained in the reduction zone of the preferred embodiment are as follows: temperature, 150 to 2100° F.; pressure, 100 to 1500 p.s.i.; residence time, 1 to 30 minutes; carbon depletion per pass, 1 to 10 percent of the carbon in the carbonaceous solids; and weight ratio of char to iron oxides, 0.5 to 5 lb./lb.

The mixture of reduced iron oxides, principally Fe and FeO, along with partially carbon-depleted carbonaceous solids drops by gravity through an outlet conduit 70 to a separator 72. The latter is adapted to confine the mixture of solids in a fluidized state, the fluidizing gas being introduced by a pipe 74. The fluidizing gas may be essentially inert, or it may contain some steam. If it does contain steam, then some hydrogen may be generated, in which case the effluent gas from the separator may be conducted to the Oxidizer. Otherwise, the effluent gas may be discharged conveniently through conduit 75. Because of the different densities of the carbonaceous solids and the iron compounds, fluidization conditions can be selected to permit the iron compounds to settle out of the bed to be discharged through a conduit 76 into the oxidation zone 42. The fluidized char overflows into a pipe 78 which leads to the previously mentioned lift pipe 66. Air is introduced into the foot of the lift pipe through a pipe 80 not only to lift the solids back to the reductor, but also to burn part of the carbonaceous solids under controlled conditions to raise the temperature of the solids sufficiently high to provide the heat required in the reduction zone. Additional air may be introduced into the space above the reduction zone through a pipe 82 to effect combustion of the carbon monoxide generated in the reduction zone, as well as some of the carbonaceous solids from the lift pipe 66.

The following example illustrates the operation of the preferred embodiment.

Figure 3:
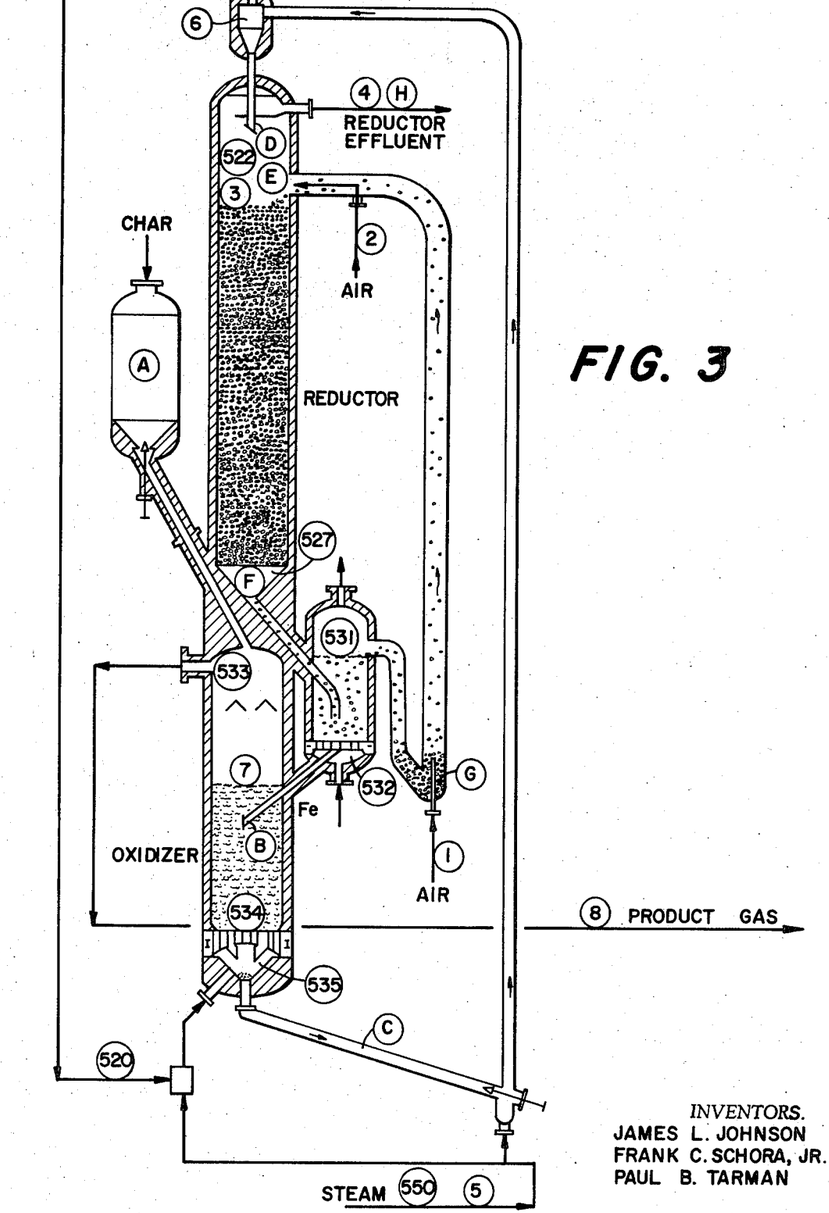
FIG. 3 is the same diagrammatic drawing of FIG. 2 but showing the locations of different points in the solids and gas streams to aid in understanding the material balance run reported in Table I of the specification.

The conditions maintained and results obtained in a material balance run are set forth in the following Table I wherein the conditions and compositions of the various gas and solids streams are tabulated. The gas streams are designated by numerals 1 to 8 inclusive, and the solids streams by letters A to H inclusive. The so designated streams are shown in FIG. 3 by the encircled numerals or letters, as the case may be. In addition, the pressures in pounds per square inch are shown by the encircled 3-digit numbers at several points throughout the system.

the lift pipe is maintained, by suitable regulation of the temperature of the steam and iron oxides, between 1300

TABLE I
GAS STREAMS

| No. | 1 | 2 | 3 | 4 | 5 | 6 | 7 | 8 |
|---|---|---|---|---|---|---|---|---|
| Moles/hr. | 2.93 | 1.47 | 1.62 | 5.72 | 6.99 | 6.99 | 7.02 | 8.78 |
| Pressure, p.s.i.a. | | | 522 | 522 | 550 | 521 | 533 | 530 |
| Temperature, °F. | 842 | 842 | 1,971 | 1,866 | 1,165 | 1,656 | 1,700 | 1,347 |
| Composition, percent vol.: | | | | | | | | |
| $O_2$ | 20.99 | 20.99 | | | | | | |
| $N_2$ | 79.01 | 79.01 | | 60.62 | | | | 0.51 |
| CO | | | 35.62 | | | | 11.55 | 10.18 |
| $CO_2$ | | | 64.38 | 39.38 | | | 9.26 | 8.34 |
| $CH_4$ | | | | | | | 20.49 | 20.84 |
| $H_2$ | | | | | | 18.25 | 27.06 | 32.36 |
| $H_2O$ | | | | | 100.00 | 81.75 | 31.65 | 26.49 |
| $H_2S$ | | | | | | | | 1.26 |

SOLIDS STREAMS

| No. | A | B | C | D | E | F | G | H |
|---|---|---|---|---|---|---|---|---|
| Lb./hr. | 100 | 666 | 732 | 753 | 1,562 | 2,236 | 1,569 | 17 |
| Temperature, °F. | 350 | 1,795 | 1,700 | 1,656 | 1,948 | 1,795 | 1,770 | 1,866 |
| Composition, wt. percent: | | | | | | | | |
| C | 70.55 | | 3.96 | 3.85 | 45.31 | 31.99 | 45.57 | 11.40 |
| H | 3.93 | | | | | | | |
| N | 1.24 | | | | | | | |
| O | 5.69 | | | | | | | |
| S | 3.56 | | | | | | | |
| Ash | 15.03 | | 2.05 | 2.00 | 54.69 | 38.21 | 54.43 | 88.60 |
| Fe | | 11.03 | | | | 3.29 | | |
| $Fe_{.947}O$ | | 88.97 | 93.99 | 47.03 | | 26.51 | | |
| $Fe_3O_4$ | | | | 47.12 | | | | |

Figure 4:
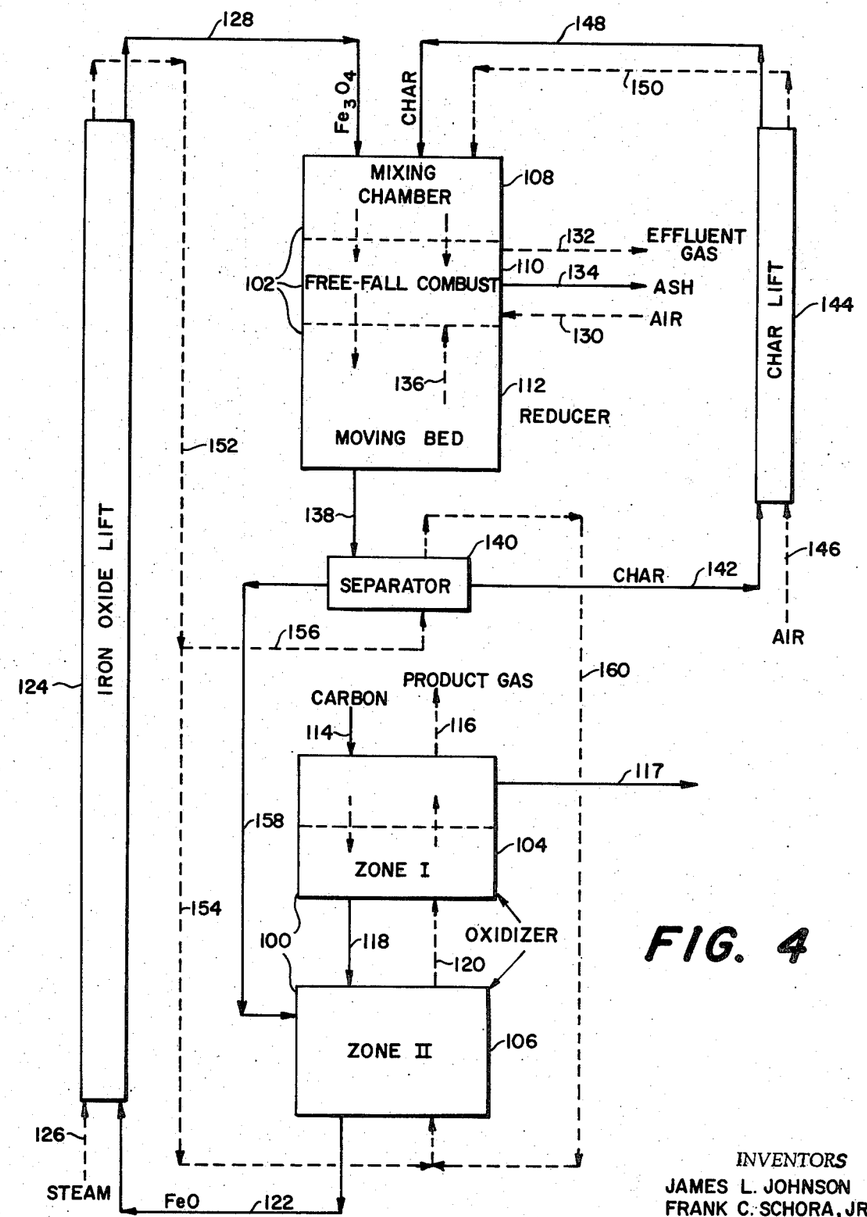
FIG. 4 is a schematic drawing of a modification of the preferred embodiment of FIG. 2.

A modification of the preferred embodiment is shown in FIG. 4. Numerals 100 and 102 designate the Oxidizer and the Reducer respectively. The Oxidizer consists of two superimposed fluidized zones, Zone I and Zone II, designated by the numerals 104 and 106 respectively. Zone I is intended to serve primarily for the reaction of carbonaceous solids with hydrogen to make methane, while Zone II is intended to serve primarily for the reaction of steam and Fe or FeO to make hydrogen. The Reducer 102 consists of three superimposed zones, designated by the numerals 108, 110 and 112 respectively. Zone 108 is a mixing chamber wherein incoming $Fe_3O_4$ and FeO and carbonaceous solids are mixed. Zone 110 is a combustion zone where carbon monoxide and/or the carbonaceous solids, while falling freely in admixture with the iron oxides, are partially burned to supply heat. Zone 112 is the reduction zone itself, consisting of a downwardly moving bed of the mixture of iron oxides and carbonaceous solids.

The operation of the process illustrated in FIG. 4 is as follows. Solid lines indicate solids streams and dotted lines, gas streams. Hydrocarbonaceous solids (identified as "carbon") containing a volatile hydrocarbonaceous component and a fixed carbon component are fed continuously through 114 into the Zone I of the Oxidizer 100. A fluidized bed of the hydrocarbonaceous solids is maintained at a temperature between 1400 and 1800° F. and at a pressure between 100 and 1500 p.s.i. in order to optimize the reaction between the hydrocarbonaceous solids and hydrogen. The product gas comprising principally methane and hydrogen is withdrawn through a conduit 116, after being freed of solids and condensibles which are shown schematically as discharged through conduit 117. The partially reacted carbonaceous solids from Zone I are conducted by gravity down through a conduit 118 to the lower Zone II. In this zone, a fluidized bed of carbonaceous solids is maintained at a temperature between 1400 and 1800° F. and at a pressure between 100 and 1500 p.s.i. The gaseous product from this zone contains principally hydrogen and unreacted steam, with some CO, $CO_2$, and $CH_4$, and is conducted through a conduit 120 to the upper Zone II to serve as fluidizing reactant in Zone I.

The mixture of iron oxides from Zone II is withdrawn therefrom through a conduit 122 to an iron oxide lift pipe 124 wherein the mixture of oxides is lifted by steam introduced through a conduit 126. The temperature in the lift pipe is maintained, by suitable regulation of the temperature of the steam and iron oxides, between 1300 and 1800° F., thereby promoting the reaction of the steam with FeO in the feed to the lift pipe to form $Fe_3O_4$. The latter is separated from the effluent gases by any suitable means at the top of the lift pipe. The iron oxides comprising principally $Fe_3O_4$ and FeO are carried by a conduit 128 to the mixing chamber 108 at the top of the Reducer vessel where they are mixed with char entering the mixing chamber from conduit 148.

The iron oxides and char which are intimately mixed in the mixing chamber 108 are then allowed to fall freely through the combustion zone 110. The latter is suitably supplied with air through a conduit 130, in sufficient quantity to partially burn the char and thereby raise the temperature of the mixture of solids to that required for reduction of the iron oxides. Effluent gas and ash are discharged from the combustion zone by any suitable means, schematically shown in the figure as two conduits 132 and 134 respectively.

The hot mixture of iron oxides and char is dropped onto the top of downwardly moving bed 112 wherein the iron oxides are reduced to Fe and FeO. The only gases present in the moving bed are those generated in situ as schematically illustrated by the dotted arrow 136. The solid product from the reduction zone is removed through a conduit 138 to a Separator 140. A fluidized bed is maintained in this Separator as described before, and the velocity of the fluidizing gas is so regulated that the reduced iron oxides drop down while the char remains in a fluidized state and overflows through a separate discharge conduit 142. The char is recycled to the Reducer through a lift pipe 144 by means of air introduced through conduit 146. The air also serves, as before, to burn part of the char for process heat. The hot solids are conducted from the top of the lift pipe through a conduit 148 to the mixing chamber 108. The effluent gas from the lift pipe 144 is also conducted to the mixing chamber and is shown schematically, in order to show all gas streams as well as solids streams, as being conducted through a separate conduit 150, although it would normally not be handled separately.

The gas stream issuing from the top of the iron oxide lift pipe 124, as stated before, comprises principally hydrogen and unreacted steam. This gas stream is carried by conduits 152 and 154 to Zone II, and, if desired, a slip stream may be conducted to the Separator 140 by means of a conduit 156. Thus, it may serve as the fluidizing gas in the Separator; but, in that case, in the course of passing in contact with the reduced iron oxide, will reoxidize at least some of the Fe to FeO, which in turn will react, at least to some extent, with the steam to form hydrogen. The mixture of reduced iron oxides, including any FeO formed by the reaction of steam and Fe or FeO in the Separator, is conducted to Zone II via conduit 158 from the Separator. The effluent gas from the Separator, including any hydrogen formed by the reaction of steam and Fe or FeO in the Separator, is conducted to Zone II by a conduit 160, joining up with conduit 154 at the inlet to Zone II.

The following example illustrates the operation of the modification of the preferred embodiment shown in FIG. 4.

Figure 5:
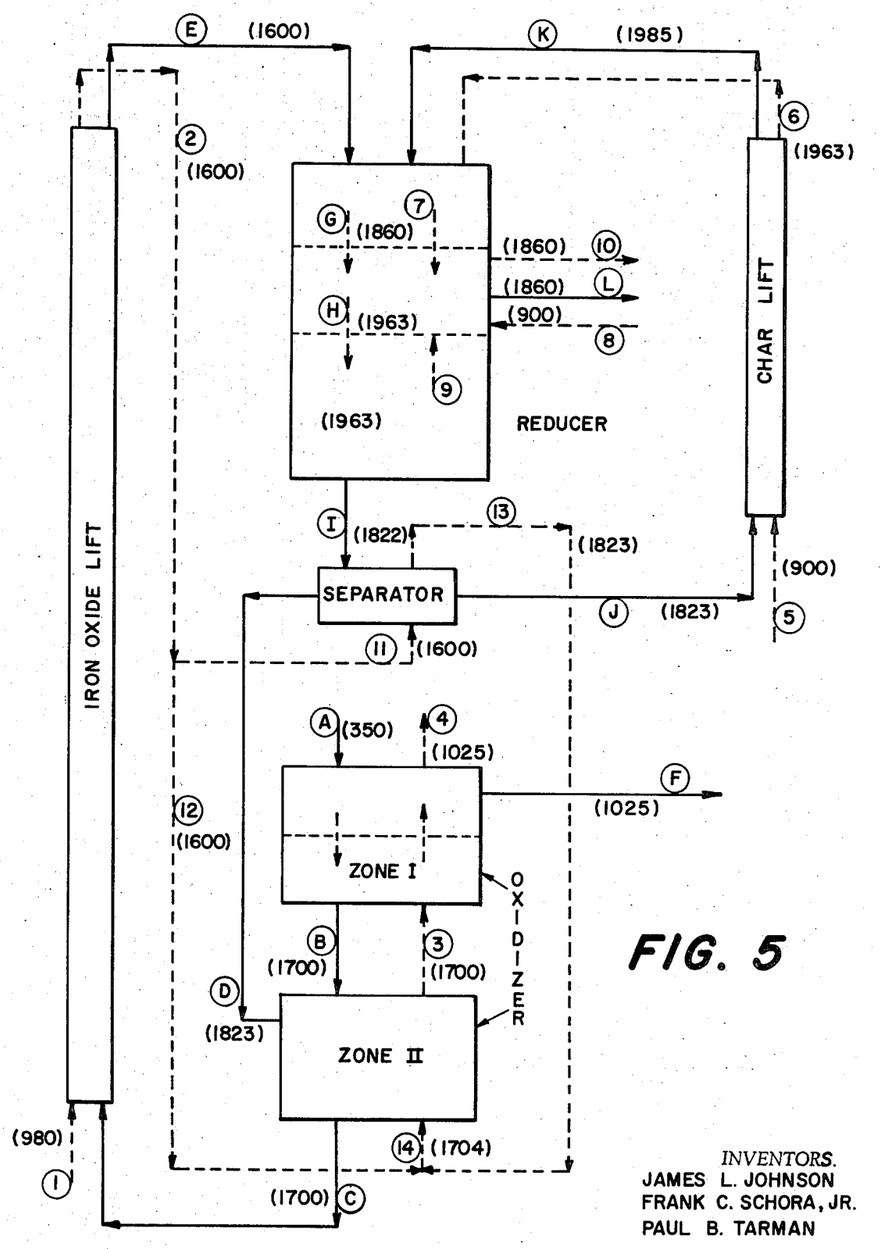
FIG. 5 is the same schematic drawing of FIG. 4 but showing the locations of different points in the solids and gas streams to aid in understanding the material balance run reported in Table II of the specification.

The conditions maintained and results obtained in a material balance run are set forth in the following Table II wherein the conditions and compositions of the various gas and solids streams are tabulated. The gas streams are designated by numerals 1 to 14 inclusive, and the solids streams by letters A to L inclusive. The so designated streams are shown in FIG. 5 by the encircled corresponding numerals or letters. In addition, the temperatures in ° F. of the several streams are shown by the 4-digit numbers in parentheses.

duction zone: temperature, 1000 to 2600° F.; pressure, atmospheric or superatmospheric; residence time of said solids, 15 seconds to 60 minutes; carbon depletion per pass, 1 to 10 percent of the carbon in said carbonaceous solids; and a carbon content of said carbonaceous solids which is at least twenty percent by weight, whereby the iron oxides are reduced to a mixture comprising principally FeO and Fe, (d) partially burning carbon-depleted carbonaceous solids from step (b) outside the reduction zone to raise the temperature of said carbonaceous solids sufficiently high to supply adiabatically the heat required in said reduction zone, (e) returning said partially-burned carbonaceous solids from step (d) to said reduction zone, (f) reacting reduced iron oxides from step (b) with steam in the presence of hydrocarbonaceous solids in an oxidation zone, (g) maintaining the following conditions in said oxidation zone: temperature, 1000 to 2000° F.; and pressure, atmospheric or superatmospheric, whereby hydrogen and methane are formed and a mixture of iron oxides comprising principally $Fe_3O_4$ and FeO is produced, and

TABLE II

GAS STREAMS—LB. MOLES/HR.

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CO | | | | .0997 | .1746 | | | | | .0733 | | | | |
| $CO_2$ | | | | .0851 | .1585 | .0001 | .1001 | .1001 | .0001 | .1955 | .4058 | | | |
| $H_2$ | | | .2300 | .5773 | .6473 | | | | | .0029 | | .1150 | .1150 | .365 | .480 |
| $H_2O$ | 1.4660 | 1.2360 | | .7161 | .5811 | | .0069 | .0069 | | .0157 | .0281 | .6180 | .6180 | .368 | .986 |
| $CH_4$ | | | | .0952 | .2516 | | | | | | | | | | |
| $C_2H_6$ | | | | | .0057 | | | | | | | | | | |
| $C_6H_6$ | | | | | .0016 | | | | | | | | | | |
| $N_2$ | | | | .0063 | .3848 | .3848 | .3848 | .2837 | | .6685 | | | | |
| $H_2S$ | | | .0016 | .1050 | | | | | | | | | | |
| $O_2$ | | | | | | .1035 | | | .0763 | | | | | |
| COS | | | | | | .0001 | .0001 | | | .0003 | | | | |
| A | | | | | | .0046 | .0046 | .0046 | .0034 | | .0080 | | | |

SOLIDS STREAMS—LB. MOLES/HR.

| | A | B | C | D | E | F | G | H | I | J | K | L |
|---|---|---|---|---|---|---|---|---|---|---|---|---|
| C | 1.0580 | .7150 | .4350 | | .4350 | .0173 | 9.9213 | 9.8552 | 9.5864 | 9.5864 | 9.4863 | .0291 |
| $H_2$ | .3399 | .0495 | .0301 | | .0301 | .0073 | .6867 | .6821 | 66.35 | .6635 | .6566 | .0020 |
| O | .0879 | | | | | .0012 | | | | | | |
| $N_2$ | .0078 | .0015 | .0015 | | .0015 | | .0930 | .0915 | .0915 | .0915 | .0915 | .0015 |
| S [1] | .0132 | | | | | | | | | | | |
| FeS [1] | .0057 | .0055 | .0039 | | .0039 | | .2220 | .2182 | .2182 | .2182 | .2181 | .0036 |
| Fe [1] | | .0002 | .0018 | | .0018 | | .1295 | .1276 | .1276 | .1276 | .1277 | .0021 |
| Ash [2] | 1.8546 | 1.8546 | 1.8546 | | 1.8546 | | 88.1493 | 86.2947 | 86.2947 | 86.2947 | 86.2947 | 1.8546 |
| Fe | | | | | | | | | .23675 | | | |
| $Fe_{0.947}O$ | | | 1.4667 | 1.4667 | .5911 | | .5911 | .5911 | 1.2167 | | | |
| $Fe_3O_4$ | | | | | .2764 | | .2764 | .2764 | | | | |
| MgO | | | .7598 | .7598 | .7598 | | .7598 | .7598 | .7598 | | | |
| $SiO_2$ | | | .3550 | .3550 | .3550 | | .3550 | .3550 | .3550 | | | |

[1] Associated with the ash content of the char.
[2] Given in lbs./hr.

According to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:

1. A process for the gasification of hydrocarbonaceous solids which comprises:

(a) passing a stream of particulate iron oxides comprising principally $Fe_3O_4$ and FeO and a stream of particulate carbonaceous solids concurrently and downwardly into the top of a reduction zone, (b) subjecting said stream of particulate iron oxides to direct reactive contact with said stream of particulate carbonaceous solids in a downwardly moving bed in said reduction zone, there being no molecular oxygen-containing gas introduced into the moving bed in the reduction zone, (c) maintaining the following conditions in said re- (h) returning said mixture of iron oxides from step (f) to said reduction zone of step (a) to repeat the cycle.

2. The process according to claim 1 in which the reduction zone is maintained at a temperature between 1500 and 2100° F. and a pressure between 100 and 1500 p.s.i.; and the oxidation zone is maintained at a temperature between 1400 and 1800° F. and a pressure between 100 and 1500 p.s.i.

3. A process for the gasification of hydrocarbonaceous solids which comprises:

(a) passing a stream of particulate iron oxides comprising principally $Fe_3O_4$ and FeO and a stream of particulate carbonaceous solids concurrently and downwardly into the top of a reduction zone, (b) subjecting said stream of particulate iron oxides to direct reactive contact with said stream of particulate carbonaceous solids in a downwardly moving bed in said reduction zone, there being no molecular oxygen-containing gases introduced into said moving bed in said reduction zone, (c) maintaining the following conditions in said reduction zone: temperature, 1000 to 2600° F.; pressure, atmospheric or superatmospheric; residence time of solids, 15 seconds to 60 minutes; carbon depletion of said carbonaceous solids per pass through said reduction zone, 1 to 10 percent of the carbon in said carbonaceous solids; and a carbon content of said carbonaceous solids which is at least twenty percent by weight, whereby said iron oxides are reduced to a mixture comprising principally FeO and Fe, (d) withdrawing the mixture of carbon-depleted carbonaceous solids and reduced iron oxides from said reduction zone and transferring said mixture to a separation zone, (e) passing a gas through said mixture of carbon-depleted carbonaceous solids and reduced iron oxides in said separation zone at a velocity sufficient to effect separation by virtue of the difference in densities of the reduced iron oxides and carbonaceous solids, (f) withdrawing carbon-depleted carbonaceous solids from said separation zone and partially burning same outside said reduction zone to raise the temperature of said carbonaceous solids sufficiently high to supply adiabatically the heat required in said reduction zone, (g) returning said partially-burned carbonaceous solids to said reduction zone, (h) withdrawing iron oxides from said separation zone and reacting same with steam in the presence of hydrocarbonaceous solids in an oxidation zone, (i) maintaining the following conditions in said oxidation zone: temperature, 1000 to 2000° F.; and pressure, atmospheric or superatmospheric, whereby hydrogen and methane are formed and a mixture of iron oxides comprising principally $Fe_3O_4$ and FeO is produced, and (j) returning said mixture of iron oxides from said oxidation zone to said reduction zone.

4. The process according to claim 3 in which the reduction zone is maintained at a temperature between 1500 and 2100° F. and a pressure between 100 and 1500 p.s.i.; and the oxidation zone is maintained at a temperature between 1400 and 1800° F. and a pressure between 100 and 1500 p.s.i.

5. A process for the gasification of hydrocarbonaceous solids which comprises:

(a) passing a stream of particulate iron oxides comprising principally $Fe_3O_4$ and FeO and a stream of particulate carbonaceous solids concurrently and downwardly into the top of a reduction zone, (b) subjecting said stream of particulate iron oxides to direct reactive contact with said stream of particulate carbonaceous solids in a downwardly moving bed in said reduction zone, there being no molecular oxygen-containing gases introduced into said moving bed in said reduction zone, (c) maintaining the following conditions in said reduction zone: temperature, 1000 to 2600° F.; pressure, atmospheric or superatmospheric; residence time of solids, 15 seconds to 60 minutes; carbon depletion of said carbonaceous solids per pass through said reduction zone, 1 to 10 percent of the carbon in said carbonaceous solids; and a carbon content of said carbonaceous solids which is at least twenty percent by weight, whereby said iron oxides are reduced to a mixture comprising principally FeO and Fe, (d) withdrawing the mixture of carbon-depleted carbonaceous solids and reduced iron oxides from said reduction zone and transferring said mixture to a separation zone, (e) passing a fluidizing gas through said mixture of carbon-depleted carbonaceous solids and reduced iron oxides in said separation zone at such a velocity that a fluidized bed of said carbonaceous solids is established and maintained from which said iron oxides and said carbonaceous solids may be separately withdrawn, (f) withdrawing carbon-depleted carbonaceous solids from said fluidized separation zone and partially burning same outside said reduction zone to raise the temperature of said carbonaceous solids sufficiently high to supply adiabatically the heat required in said reduction zone, (g) returning said partially-burned carbonaceous solids to said reduction zone, (h) withdrawing iron oxides from said separation zone and reacting same with steam in the presence of hydrocarbonaceous solids in an oxidation zone, (i) maintaining the following conditions in said oxidation zone: temperature, 1000 to 2000° F.; pressure, atmospheric or superatmospheric; and residence time of the solids, 30 seconds to 200 minutes, whereby hydrogen and methane are formed and a mixture of iron oxides comprising principally $Fe_3O_4$ and FeO is produced, and (j) returning said mixture of iron oxides from said oxidation zone to said reduction zone.

6. The process according to claim 5 in which the reduction zone is maintained at a temperature between 1500 and 2100° F. and a pressure between 100 and 1500 p.s.i.; and the oxidation zone is maintained at a temperature between 1400 and 1800° F. and a pressure between 100 and 1500 p.s.i.

7. The process according to claim 5 in which the fluidizing gas used in the separation zone is an inert gas.

8. The process according to claim 5 in which the fluidizing gas used in the separation zone contains steam.

9. The process according to claim 5 in which the hydrocarbonaceous solids in the oxidation zone are maintained therein as a fluidized bed.

10. A process for the gasification of hydrocarbonaceous solids which comprises:

(a) passing a stream of particulate iron oxides comprising principally $Fe_3O_4$ and FeO and a stream of particulate carbonaceous solids concurrently and downwardly into the top of a reduction zone, (b) subjecting said stream of particulate iron oxides to direct reactive contact with said stream of particulate carbonaceous solids in a downwardly moving bed in said reduction zone, there being no molecular oxygen-containing gas introduced into the moving bed in the reduction zone, (c) maintaining the following conditions in said reduction zone: temperature, 1500 to 2100° F. and a pressure between 100 and 1500 p.s.i.; residence time of said solids, 15 seconds to 60 minutes; carbon depletion per pass, 1 to 10 percent of the carbon in said carbonaceous solids; and a carbon content of said carbonaceous solids which is at least twenty percent by weight, whereby the iron oxides are reduced to a mixture comprising principally FeO and Fe, (d) passing a gas through the mixture of reduced iron oxides and carbon-depleted carbonaceous solids from said reduction zone in a separation zone at such a velocity that a fluidized bed of the carbonaceous solids is formed from which the reduced iron oxides may be readily withdrawn, (e) partially burning the separated carbonaceous solids outside the reduction zone to raise the temperature of said carbonaceous solids sufficiently high to supply adiabatically the heat required in the reduction zone;

(f) returning said partially-burned carbonaceous solids to said reduction zone, (g) establishing and maintaining a first fluidized bed of hydrocarbonaceous solids at a temperature between 1400 and 1800° F. and a pressure between 100 and 1500 p.s.i., (h) conducting reduced iron oxides from said separation zone to the bed established in step (g) and allowing said iron oxides to fall by gravity in countercurrent relationship with steam flowing upwardly in said bed, whereby hydrogen and methane are formed.

(i) establishing and maintaining a second fluidized bed of hydrocarbonaceous solids at a temperature between 1400 and 1800° F. and a pressure between 100 and 1500 p.s.i., said second fluidized bed being interconnected to the fluidized bed of step (g) so that the solids from the second fluidized bed flow into the fluidized bed of step (g) and the product gas from the fluidized bed of step (g) flows into the second fluidized bed, whereby a product gas enriched in methane is produced in the second fluidized bed, and (j) returning iron oxides withdrawn from the fluidized bed of step (g) to the reduction zone to repeat the cycle.

References Cited
UNITED STATES PATENTS

| | | | |
|---|---|---|---|
| 2,449,635 | 9/1948 | Barr | 23—214 |
| 2,602,809 | 7/1952 | Dickinson | 23—214 X |
| 2,640,034 | 5/1953 | Jones | 23—214 X |
| 3,017,250 | 1/1962 | Watkins | 23—214 |
| 3,076,702 | 2/1963 | Hemminger | 23—214 X |
| 3,222,147 | 12/1965 | Benson | 23—214 X |
| 3,503,724 | 3/1970 | Benson | 23—214 X |

JOSEPH SCOVRONEK, Primary Examiner

UNITED STATES PATENT OFFICE
CERTIFICATE OF CORRECTION

Patent No. 3,700,422                 Dated October 24, 1972

Inventor(s) James L. Johnson, Frank C. Schora, Jr. and Paul B. Tarman

It is certified that error appears in the above-identified patent and that said Letters Patent are hereby corrected as shown below:

Column 2, line 25:     After "gas", the word "cell" should read --call--;

Column 6, line 33:     After "temperature", "150 to 2100°F." should read --1500 to 2100°F.--;

In Table II
(Gas Streams)
Column 4 of Table:     The last figure ".1050" should read --.0150--.

Signed and sealed this 22nd day of May 1973.

(SEAL)
Attest:

EDWARD M. FLETCHER, JR.            ROBERT GOTTSCHALK
Attesting Officer                    Commissioner of Patents